(12) United States Patent
Van Den Engel

(10) Patent No.: US 7,926,247 B2
(45) Date of Patent: Apr. 19, 2011

(54) AGRICULTURAL MACHINE WITH A TWO STAGE LIFT ACTUATOR FOR PIVOTING A CROP PROCESSING MEMBER

(75) Inventor: Alfonsus Jacobus Van Den Engel, Schiedam (NL)

(73) Assignee: Maasland N.V., Maassluis (NL)

( * ) Notice: Subject to any disclaimer, the term of this patent is extended or adjusted under 35 U.S.C. 154(b) by 83 days.

(21) Appl. No.: 11/802,163

(22) Filed: May 21, 2007

(65) Prior Publication Data

US 2007/0266688 A1    Nov. 22, 2007

(30) Foreign Application Priority Data

May 22, 2006   (NL) ...................................... 1031852

(51) Int. Cl.
A01D 34/00           (2006.01)
(52) U.S. Cl. ...................................................... 56/15.9
(58) Field of Classification Search ................... 56/11.9, 56/15.9, DIG. 11, 14.9, 15.5, 15.7, 370, 371; 172/413; 92/66, 152; 91/167 R
See application file for complete search history.

(56) References Cited

U.S. PATENT DOCUMENTS

| | | | |
|---|---|---|---|
| 2,309,203 A | | 1/1943 | Morkoski |
| 2,483,239 A * | | 9/1949 | Sharpe ........................ 91/167 R |
| 2,789,711 A * | | 4/1957 | Burrus ........................... 414/712 |
| 3,186,309 A * | | 6/1965 | Killebrew ................... 91/167 R |
| 3,187,637 A * | | 6/1965 | Edmund ..................... 91/167 R |
| 3,754,666 A * | | 8/1973 | Suverkrop .................... 212/300 |
| 4,017,110 A * | | 4/1977 | Pease et al. ................ 294/81.21 |
| 4,212,243 A * | 7/1980 | Haegermann ..................... 101/4 |
| 4,825,958 A * | 5/1989 | Kelderman .................... 172/413 |
| 5,249,502 A * | 10/1993 | Radocaj .......................... 91/173 |
| 5,341,725 A * | 8/1994 | Dick .................................. 92/66 |
| 5,807,060 A * | 9/1998 | Hamlik ......................... 414/668 |
| 6,000,349 A * | 12/1999 | Sterken ........................ 111/118 |
| 6,109,012 A * | 8/2000 | Staal et al. ...................... 56/367 |
| 6,112,827 A * | 9/2000 | Reiber et al. .................. 172/311 |
| 6,131,669 A * | 10/2000 | Friggstad et al. ............. 172/311 |
| 6,136,609 A * | 10/2000 | Sato et al. ...................... 436/180 |
| 6,167,972 B1 * | 1/2001 | Hundeby et al. .............. 172/501 |
| 6,189,465 B1 * | 2/2001 | Burns et al. ..................... 111/33 |
| 6,192,994 B1 * | 2/2001 | Friggstad et al. ............. 172/311 |
| 6,202,756 B1 * | 3/2001 | Hundeby et al. .............. 172/311 |

(Continued)

FOREIGN PATENT DOCUMENTS

FR         2818496         6/2002

(Continued)

*Primary Examiner* — Thomas B Will
*Assistant Examiner* — Joan D Misa
(74) *Attorney, Agent, or Firm* — Coraline J. Haitjema; David P. Owen; Hoyng Monegier LLP

(57) ABSTRACT

An agricultural machine for crop processing, the agricultural machine being provided with a drawbar that is connectable to a pulling vehicle, at least one crop processing member that is pivotably fastened to the drawbar, and a hydraulic lift cylinder for pivoting the crop processing member upwards relative to the drawbar, one side of the lift cylinder being fastened to the crop processing member and its other side to the drawbar, the lift cylinder comprising a first cylinder housing connected to the crop processing member, a second cylinder housing connected to the drawbar and a common piston rod connecting the two cylinder housings and being slidably included therein, the active internal surface of the first cylinder housing being larger than the active internal surface of the second cylinder housing.

9 Claims, 3 Drawing Sheets

U.S. PATENT DOCUMENTS

| | | | |
|---|---|---|---|
| 6,263,977 B1 * | 7/2001 | Mayerle et al. | 172/311 |
| 6,293,352 B1 * | 9/2001 | Hundeby et al. | 172/456 |
| 6,302,220 B1 * | 10/2001 | Mayerle et al. | 172/459 |
| 6,305,478 B1 * | 10/2001 | Friggstad | 172/458 |
| 6,374,922 B1 * | 4/2002 | Friggstad | 172/322 |
| 6,374,923 B1 * | 4/2002 | Friggstad | 172/383 |
| 6,886,200 B2 * | 5/2005 | Blyshak et al. | 5/611 |
| 2003/0020255 A1 * | 1/2003 | Felsl et al. | 280/283 |
| 2006/0237256 A1 * | 10/2006 | Sasaki et al. | 180/442 |

FOREIGN PATENT DOCUMENTS

WO     WO97/46076     12/1997

* cited by examiner

AGRICULTURAL MACHINE WITH A TWO STAGE LIFT ACTUATOR FOR PIVOTING A CROP PROCESSING MEMBER

CROSS REFERENCE TO RELATED APPLICATIONS

This application claims priority from Dutch application number 1031852 filed on 22 May 2006, the contents of which are hereby incorporated by reference in their entirety.

BACKGROUND OF THE INVENTION

1. Field of the Invention

The invention relates to an agricultural machine for crop processing of the type that may be pulled behind a pulling vehicle. In particular, the invention relates to a machine comprising a towbar and at least one crop processing member pivotably attached thereto.

2. Description of the Related Art

A hay-making machine is known from WO-A-97/46076 comprising motor driven working members. The working members are pivotable to a transport position by means of actuators. Although this agricultural machine functions properly, there is a need for an agricultural machine which is capable of being brought in a relatively simple manner into a transport position, and which is also capable of being brought in a relatively simple manner into a headland position by only partially raising the working members.

BRIEF SUMMARY OF THE INVENTION

In order to satisfy this need, the present invention provides an agricultural machine comprising a drawbar connectable to a pulling vehicle at least one crop processing member, pivotably fastened to the drawbar and a lift actuator for pivoting the crop processing member upwards relative to the drawbar, the lift actuator comprising a first and a second cylinder housing with respective first and second pistons slideably engaged therein and at least one piston rod, wherein the cylinder housings are arranged to receive a substantially equal hydraulic pressure and an active internal surface of the first cylinder housing is different from an active internal surface of the second cylinder housing. This makes it possible to integrate a headland position into the pivoting movement to the transport position. In other words the headland position is integrated as a folding up step in the folding up sequence to the transport position. Preferably, this is thus achievable without an additional action or valve being required.

By means of the presently claimed lift actuator with cylinder housings having different active internal surfaces, a so-called pressure stage is achieved. In this context, by active internal surface is meant the surface that is in contact with the power transmitting fluid and that is perpendicular to the direction of movement of the piston. The driving force, equal to pressure times active internal surface, is then different for the two sides. It may be noted that the lift actuator could also be a lift cylinder having more than one cylinder housing.

In particular, the first cylinder housing may be connected to the crop processing member, the second cylinder housing may be connected to the drawbar, and the piston rod may be a common piston rod of the first and the second piston. This is an expedient embodiment of cylinder housing-common rod-cylinder housing, that allows effective guiding. In such embodiments, the pistons are generally arranged in alignment with one another.

Alternatively, the first and second cylinder housing are fixedly integrated back-to-back, the first piston comprises a first piston rod that is connected to the crop processing member, and the second piston comprises a second piston rod that is connected to the drawbar. This allows maximum working space at the ends of the piston rods. Furthermore, in this embodiment the pistons could be aligned but it is also possible to arrange the cylinder housings such that the pistons are moveable at an angle with respect to each other.

It is expected that the pressure in the first and the second cylinder housing should be substantially equal. To this end, both cylinder housings may be connected to a hydraulic pump by means of two parallel hydraulic connections. In an alternative embodiment, the common piston rod is hollow and opens into the first and the second cylinder housing, such as to equalize the hydraulic pressures in the first and the second cylinder housing. In this case only one hydraulic connection to the hydraulic pump is needed. It is also possible to have only one connection to the hydraulic pump, and to have a further connection between the cylinder housings in the form of an additional conduit or the like.

In another embodiment, the first and second pistons are of substantially equal surface area. The first piston is connected to a piston rod with a first cross-sectional area and the second piston is connected to a piston rod with a second cross-sectional area that is not equal to the first cross-sectional area. This allows the use of substantially equal cylinder housings, which may thus be standardized. Alternatively, the surface area of the pistons may differ.

The present invention is in particular advantageous when applied to an agricultural machine provided with a number of motor driven crop processing members rotating about generally vertical axes and arranged in at least one row extending transverse to the normal direction of travel of the machine. The plurality of crop processing members are pivotably connected with the drawbar via the lift cylinder. In this case the crop processing member may be considered as a crop processing assembly that comprises a frame carrying a plurality of individual crop processing members.

The first cylinder housing preferably serves for pivoting the crop processing member upwards into the headland position as described above. The second cylinder housing then preferably serves for further pivoting the crop processing member upwards from the headland position into a transport position. Since, according to the invention, only one lift actuator is needed for adjusting to both the headland position and the transport position, it is possible, according to the invention, to produce a very economical agricultural machine.

BRIEF DESCRIPTION OF THE DRAWINGS

The features and advantages of the invention will be appreciated upon reference to the following exemplary drawings, in which.

DESCRIPTION OF ILLUSTRATIVE EMBODIMENTS

Figure 1:
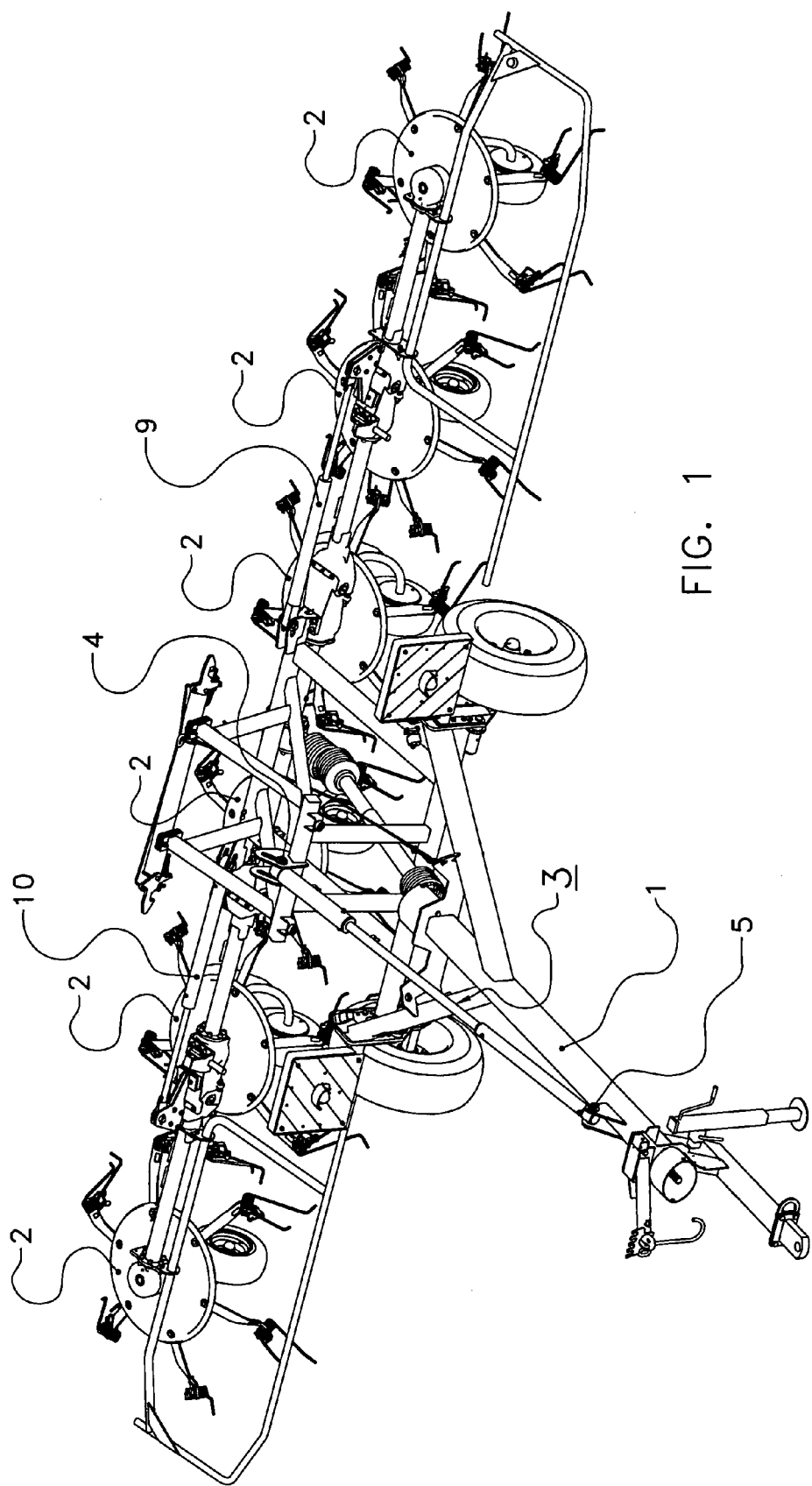
FIG. 1 is a schematic perspective front view of an agricultural machine according to the invention.

FIG. 1 shows in a schematic perspective view an agricultural machine for crop processing, in the embodiment shown a tedder. The tedder is provided with a drawbar 1 that is connectable to a (non-shown) pulling vehicle. The tedder may be otherwise generally similar to WO-A-97/46076, the contents of which are incorporated herein by reference in their entirety.

A number of (six in the embodiment shown) motor driven crop processing members 2 rotating about generally vertical axes are arranged in a row extending transverse to the normal direction of travel of the tedder. In the embodiment shown, on either side of the drawbar 1 there are arranged three crop processing members 2. The row of crop processing members 2 is pivotably connected with the drawbar 1 via a hydraulic lift cylinder 3. The hydraulic lift cylinder 3 serves inter alia for pivoting the row of crop processing members 2 upwards relative to the drawbar 1, one side of the lift cylinder 3 being fastened in a first fastening point 4 to the row of crop processing members 2 and its other side being fastened in a second fastening point 5 to the drawbar 1.

Figure 2:
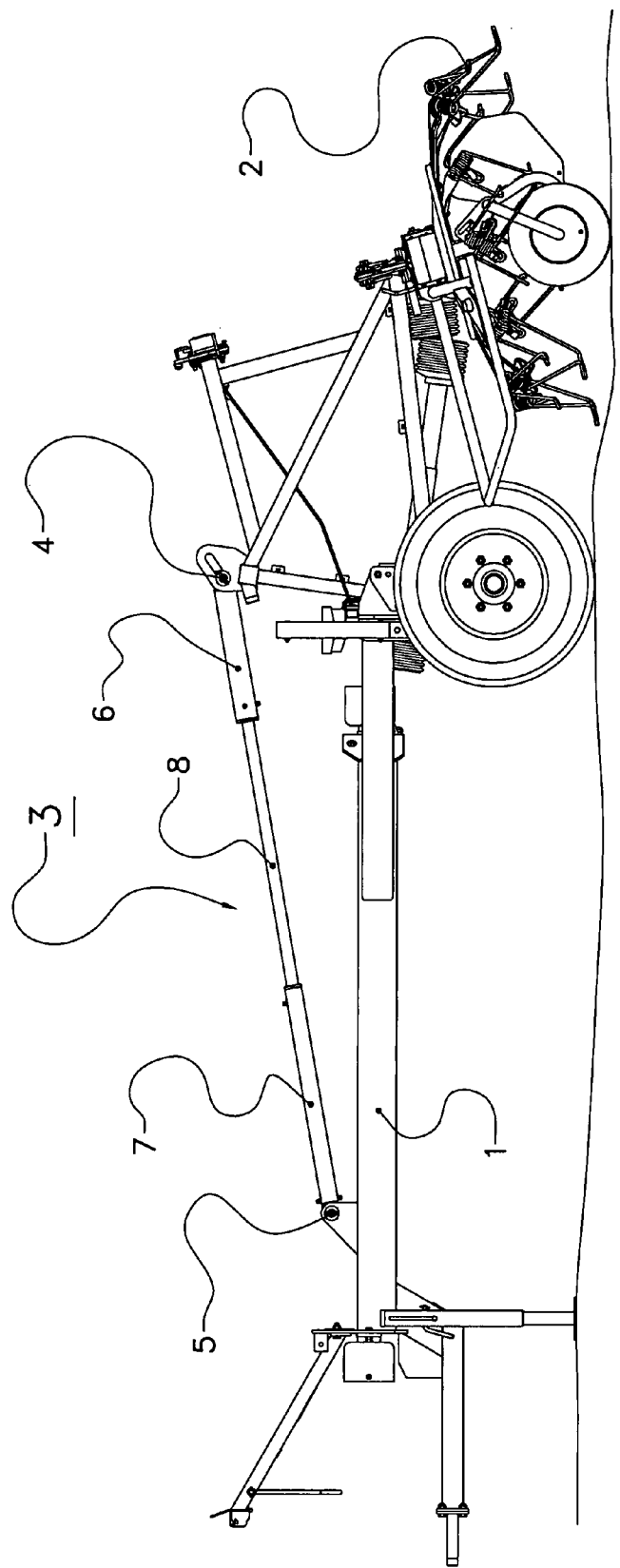
FIG. 2 is a schematic side view of the machine shown in FIG. 1.

According to the invention, as clearly visible in FIG. 2, the lift cylinder 3 comprises a first cylinder housing 6 connected to the row of crop processing members 2, a second cylinder housing 7 connected to the drawbar 1 and a common piston rod 8 connecting the two cylinder housings 6, 7 and being slidable therein. Supply lines for the hydraulic pressure are not shown for reasons of clarity but their locations will be immediately evident to the skilled person. The piston rod 8 may be hollow or solid as required.

In this case, the active internal surface of the first cylinder housing 6 is larger than the active internal surface of the second cylinder housing 7. If the diameter of the piston rod in the two cylinder housings is identical, this can be achieved in a simple manner by applying for the first cylinder housing 6 a greater internal diameter than for the second cylinder housing 7.

Owing to the fact that the diameter (i.e. the active surface) of the first cylinder housing 6 is greater than the diameter (i.e. the active surface) of the second cylinder housing 7, it is possible to achieve a sequence in folding up the tedder, so that a headland position can be included. In this case, the first cylinder housing 6 serves for pivoting the row of crop processing members 2 upwards into a headland position, and the second cylinder housing 7, that requires a higher pressure to be activated, serves for pivoting the row of crop processing members 2 upwards from the headland position into a transport position.

Between pivoting the number of crop processing members 2 arranged in a row into the headland position and pivoting them into the transport position, a preferred embodiment of the method according to the invention comprises the step of pivoting the crop processing members 2 disposed on either side of the drawbar 1 towards each other, the cylinders 9, 10 serving for this purpose.

Figure 3A:
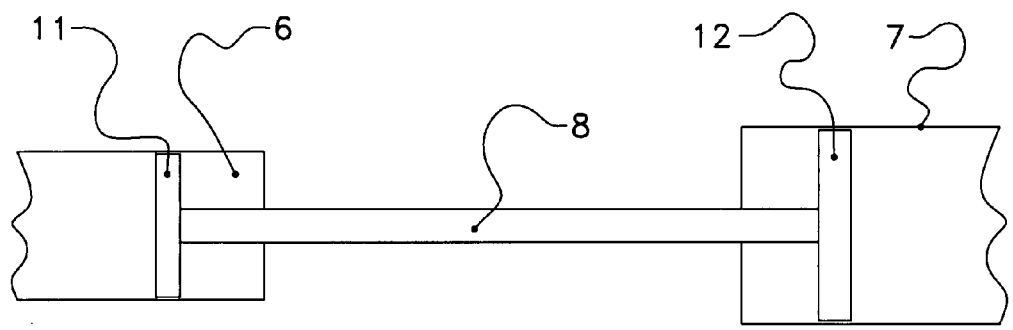
FIGS. 3a-c are schematic views of three embodiments of the hydraulic actuator of the machine shown in FIGS. 1 and 2.
Figure 3B:
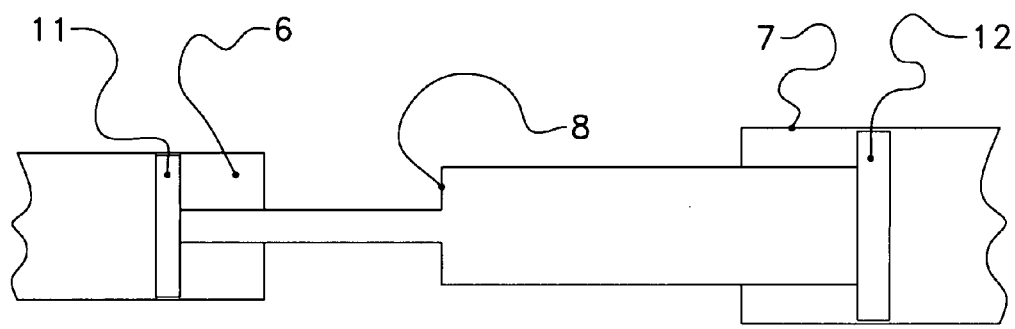
Figure 3C:
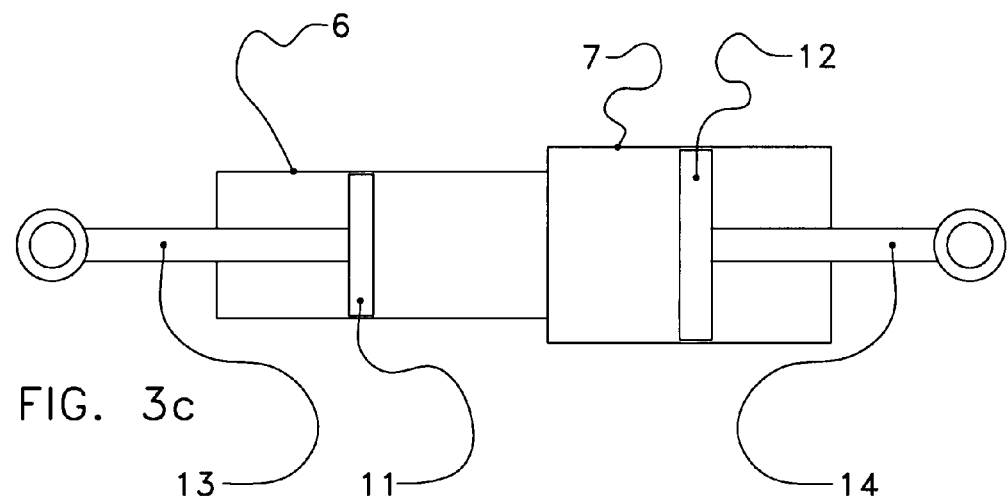

FIGS. 3a-c schematically show three embodiments a), b) and c) of the hydraulic actuator of the machine shown in FIGS. 1 and 2. Embodiment a) shows a first cylinder housing 6 and a second cylinder housing 7, with a first piston 11 and a second piston 12, respectively, connected by a common piston rod 8. The cylinder housings and pistons here being cylindrical, it can be seen that the active surface of the first cylinder housing 6 is smaller than that of the second cylinder housing 7.

Embodiment b) has first and second cylinder housings 6 and 7 and pistons 11 and 12 of equal area, but now the common rod has a cross-sectional surface area that is different in the first and second cylinder housings 6 and 7. Now, the active surface in the first cylinder housing 6 is larger than that in the second cylinder housing.

Embodiment c) shows an alternative arrangement, in which the first and second cylinder housings 6 and 7 are integrated back-to-back, with the pistons 12 and 13 now each connected to a separate piston rod 13, and 14, respectively, which in turn are connected to one of the drawbar and the crop processing member or assembly.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An agricultural machine for crop processing, the agricultural machine comprising:
 a drawbar connectable to a pulling vehicle;
 at least one crop processing member, pivotably fastened to the drawbar; and
 a lift actuator for pivoting the crop processing member upwards relative to the drawbar, the lift actuator comprising a first and a second cylinder housing with respective first and second pistons slideably engaged therein and a piston rod, wherein the cylinder housings receive a substantially equal hydraulic pressure and an internal diameter of the first cylinder housing is larger than an internal diameter of the second cylinder housing; wherein the first cylinder housing is connected to the crop processing member and configured to partially pivot the crop processing member upwards into a headland position, the second cylinder housing is connected to the drawbar and is configured to further pivot the crop processing member upwards from the headland position into a transport position, and the piston rod is a common piston rod of the first and the second piston.

2. The agricultural machine as claimed in claim 1, wherein the common piston rod is hollow and is in fluid communication with an interior of the first and the second cylinder housings, such as to equalize the hydraulic pressures in the first and the second cylinder housing.

3. The agricultural machine as claimed in claim 1, wherein the first and second pistons are of substantially equal surface area and wherein the first piston is connected to a piston rod with a first cross-sectional area and the second piston is connected to a piston rod with a second cross-sectional area that is not equal to the first cross-sectional area.

4. The agricultural machine as claimed in claim 1, wherein the agricultural machine is provided with a plurality of motor driven crop processing members rotating about generally vertical axes and arranged in a row extending transverse to a normal direction of travel of the machine, the plurality of crop processing members being pivotably connected with the drawbar via the lift actuator.

5. The agricultural machine as claimed in claim 4, wherein the plurality of motor driven crop processing members are arranged in a number of rows and the rows are pivotable with respect to one another via at least one further actuator.

6. An agricultural machine for crop processing, the agricultural machine comprising:
 a drawbar having a first portion for connection to a pulling vehicle and having a second portion;
 at least one crop processing member, pivotably fastened to the second portion of the drawbar; and a two stage lift actuator for pivoting the crop processing member upwards relative to the drawbar to a first headland position in which the crop processing member is partially raised and to a second transport position in which the crop processing member is fully raised; wherein the lift actuator comprises first and second cylinder sections operating in parallel between the crop processing member and the drawbar and a piston rod, and wherein the cylinder sections receive a substantially equal hydraulic pressure and an internal diameter of the first cylinder section is greater than an internal diameter of the second cylinder section and wherein the first cylinder section is connected to the crop processing member and is configured to lift the crop processing members into the headland position, the second cylinder section is connected to the drawbar and is configured to lift the crop processing members into the transport position, and the piston rod is a common piston rod of the first and the second cylinder sections.

7. The agricultural machine as claimed in claim 6, further comprising a pulling vehicle connected to the first portion of the drawbar.

8. The agricultural machine as claimed in claim 6, wherein the agricultural machine is provided with a plurality of motor driven crop processing members rotating about generally vertical axes and arranged in a row extending transverse to a normal direction of travel of the machine, the plurality of crop processing members being pivotably connected with the drawbar via the lift actuator.

9. The agricultural machine as claimed in claim 6, comprising a plurality of motor driven crop processing members arranged in a number of rows and the rows are pivotable with respect to one another via at least one further actuator.

* * * * *